United States Patent
Zhang et al.

(10) Patent No.: US 10,284,498 B2
(45) Date of Patent: May 7, 2019

(54) PACKET FORWARDING

(71) Applicant: New H3C Technologies Co., Ltd., Hangzhou, Zhejiang (CN)

(72) Inventors: Yang Zhang, Beijing (CN); Ling Kuang, Beijing (CN); Minghui Wang, Beijing (CN); Hongyuan Zhang, Beijing (CN); Hai Hu, Beijing (CN); Guangliang Wen, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 15/567,747

(22) PCT Filed: May 4, 2016

(86) PCT No.: PCT/CN2016/080956
§ 371 (c)(1),
(2) Date: Oct. 19, 2017

(87) PCT Pub. No.: WO2016/177320
PCT Pub. Date: Nov. 10, 2016

(65) Prior Publication Data
US 2018/0097746 A1    Apr. 5, 2018

(30) Foreign Application Priority Data
May 4, 2015    (CN) .......................... 2015 1 0222700

(51) Int. Cl.
*H04L 12/66*    (2006.01)
*H04L 12/935*    (2013.01)
(Continued)

(52) U.S. Cl.
CPC ........ *H04L 49/3009* (2013.01); *H04L 12/462* (2013.01); *H04L 12/4641* (2013.01);
(Continued)

(58) Field of Classification Search
CPC ...................................................... H04L 12/46
See application file for complete search history.

(56) References Cited

U.S. PATENT DOCUMENTS 8,923,155 B2    12/2014    Qu et al.
8,934,501 B2    1/2015    Ramesh
(Continued)

FOREIGN PATENT DOCUMENTS

CN    102970227         3/2013
CN    103095546 A       5/2013
(Continued)

OTHER PUBLICATIONS

European Patent Office, Extended European Search Report Issued in Application No. 16789314.8, dated Jan. 25, 2018, Germany, 11 pages.
(Continued)

*Primary Examiner* — Brandon M Renner
(74) *Attorney, Agent, or Firm* — McCoy Russell LLP

(57) ABSTRACT

I/O board of VXLAN switch removes first VXLAN encapsulation from a packet, determines to perform layer 3 forwarding for the packet and sends the packet to a fabric board of the VXLAN switch. The fabric board searches out a layer 3 entry matching a destination IP address of the packet from a local layer 3 table, modifies a source MAC address of the packet into a gateway MAC address of the VXLAN switch, modifies a destination MAC address of the packet into a destination MAC address in the layer 3 entry, and when an egress port in the layer 3 entry is a VXLAN tunnel port, sends the modified packet to an I/O board associated with the egress port in the layer 3 entry. The I/O board associated with the egress port receives the packet, adds second VXLAN encapsulation to the packet and forwards the packet to a VXLAN.

8 Claims, 4 Drawing Sheets

(51) Int. Cl.
 H04L 12/46 (2006.01)
 H04L 12/741 (2013.01)
 H04L 29/12 (2006.01)
 H04L 12/947 (2013.01)
(52) U.S. Cl.
 CPC ........ *H04L 45/745* (2013.01); *H04L 61/2592* (2013.01); *H04L 45/74* (2013.01); *H04L 49/252* (2013.01); *H04L 2212/00* (2013.01)

(56) References Cited

U.S. PATENT DOCUMENTS

| | | | |
|---|---|---|---|
| 2013/0124750 A1 | 5/2013 | Anumala et al. | |
| 2014/0146817 A1 | 5/2014 | Zhang | |
| 2015/0009992 A1* | 1/2015 | Zhang | H04L 49/354 370/392 |
| 2015/0063353 A1 | 3/2015 | Kapadia et al. | |
| 2015/0358232 A1* | 12/2015 | Chen | H04L 45/72 370/392 |

FOREIGN PATENT DOCUMENTS

| | | |
|---|---|---|
| CN | 103200069 A | 7/2013 |
| CN | 104158718 | 11/2014 |
| CN | 104350714 A | 2/2015 |
| CN | 104378300 A | 2/2015 |
| WO | 2014028094 A1 | 2/2014 |
| WO | 2014032620 A1 | 3/2014 |
| WO | 2015000329 A1 | 1/2015 |

OTHER PUBLICATIONS

European Patent Office, Extended European Search Report Issued in Application No. 16789315.5, dated Feb. 1, 2018, Germany, 9 pages.
European Patent Office, Extended European Search Report Issued in Application No. 16789308.0, dated Feb. 5, 2018, Germany, 11 pages.
International Search Report issued by ISA/CN for PCT/CN2016/080956 (dated Jul. 26, 2016).
United States Patent and Trademark Office, Office Action Issued in U.S. Appl. No. 15/567,887, dated Sep. 5, 2018, 17 pages.
United States Patent and Trademark Office, Office Action Issued in U.S. Appl. No. 15/568,252, dated Sep. 10, 2018, 18 pages.
Japanese Patent Office, Office Action Issued in Application No. 2018509961, dated Sep. 11, 2018, 9 pages.
State Intellectual Property Office of the People's Republic of China, Office Action and Search Report Issued in Application No. 201510220901.6, dated Dec. 5, 2018, 9 pages.
State Intellectual Property Office of the People's Republic of China, Office Action and Search Report Issued in Application No. 201510222676.X, dated Dec. 11, 2018, 8 pages.
European Patent Office, Office Action Issued in Application No. 16789314.8, dated Dec. 17, 2018, Germany, 5 pages.
State Intellectual Property Office of the People's Republic of China, Office Action and Search Report Issued in Application No. 201510222700.X, dated Dec. 27, 2018, 12 pages.

* cited by examiner

PACKET FORWARDING

BACKGROUND

Virtual eXtensible Local Area Network (VXLAN) is a layer 2 Virtual Private Network (VPN) technology based on an Internet Protocol (IP) network and adopting "Media Access Control (MAC) in User Data Protocol (UDP)" encapsulation. The VXLAN may implement layer 2 interconnection among distributed physical sites based on service providers or enterprise IP networks, and may provide service isolation for different tenants. The VXLAN may be applied to a data center network.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A frame-type switch includes a main board, an Input/Output (I/O) board and a fabric board. The main board is a single board for implementing calculation of a protocol stack, distribution and control of a forwarding entry and device management. The I/O board is a single board for implementing forwarding of data packets, for example, internal forwarding and external forwarding of data packets. The fabric board is a single board for forwarding a data packet and a control packet between boards and between chips inside a device. A chip on the fabric board has a packet forwarding function and may forward packets between different I/O boards.

Similar to the structure of the frame-type switch, a VXLAN switch includes a main board, an I/O board and a fabric board. In an example, the number of I/O boards is larger than 1.

In a VXLAN application, the fabric board of the VXLAN switch is set as the fabric board of the frame-type switch. A chip on the fabric board of the VXLAN switch has a packet forwarding function and may forward packets between different I/O boards.

In some examples of the present disclosure, a VXLAN switch may be selected as a gateway. The VXLAN switch selected as the gateway is called a gateway VXLAN switch and may be improved.

The gateway VXLAN switch may be improved as follows.

The fabric board of the gateway VXLAN switch uses a chip with a forwarding function and various entry functions. The entry functions include a function of receiving and saving an entry distributed by the main board, an entry searching function and so on. For example, the chip used by the fabric board may be a switch chip used by the I/O board of the gateway VXLAN switch.

When the fabric board of the gateway VXLAN switch uses the chip with the forwarding function and the entry functions, layer 3 forwarding of a packet entering the gateway VXLAN switch may be implemented via the cooperation of the I/O board and the fabric board of the gateway VXLAN switch. A method for forwarding a packet across a VXLAN will be described hereinafter with reference to some examples and FIG. 1.

Figure 1:
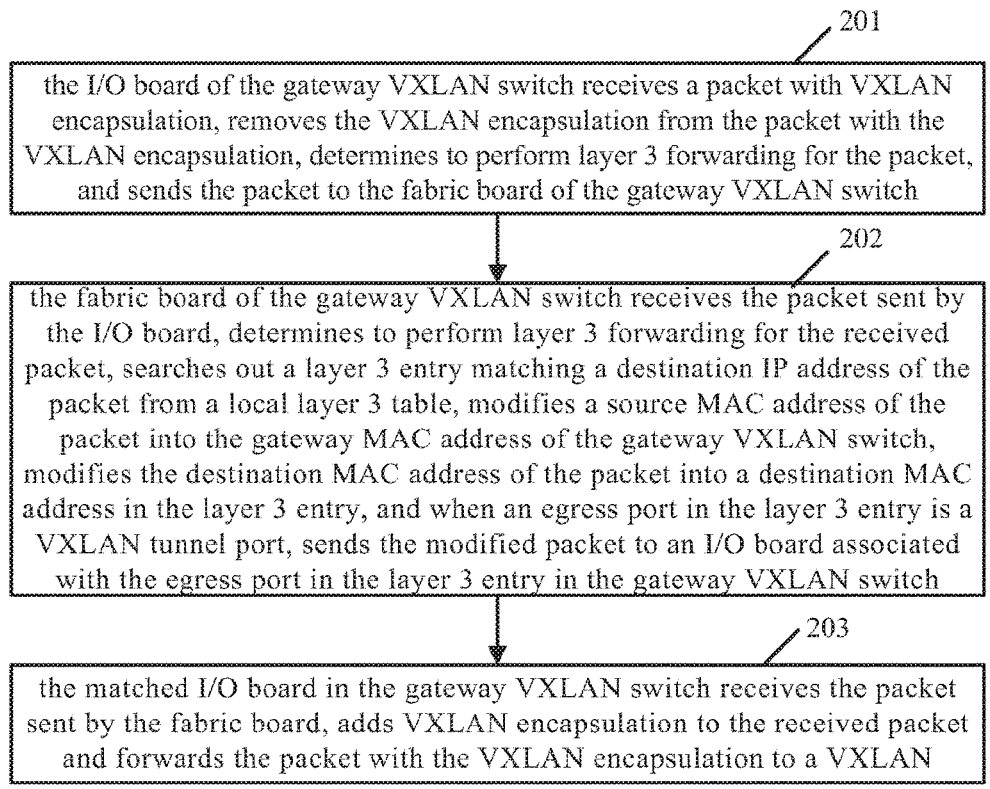
FIG. 1 is a flowchart illustrating a method for forwarding a packet across a VXLAN according to some examples of the present disclosure.

FIG. 1 is a flowchart illustrating a method for forwarding a packet across a VXLAN according to some examples of the present disclosure. The method may be applied to a gateway VXLAN switch. The fabric board of the gateway VXLAN switch uses a chip with a forwarding function and various entry functions. For example, the chip used by the fabric board may be the same as that used by the I/O board of the gateway VXLAN switch. Accordingly, as shown in FIG. 1, the method includes following blocks 201 to 203.

At block 201, the I/O board of the gateway VXLAN switch receives a packet with VXLAN encapsulation, removes the VXLAN encapsulation from the packet with the VXLAN encapsulation, determines to perform layer 3 forwarding for the packet, and sends the packet to the fabric board of the gateway VXLAN switch.

In an example of block 201, before the I/O board of the gateway VXLAN switch removes the VXLAN encapsulation from the packet with the VXLAN encapsulation, the method further includes: identifying a Virtual Network ID (VNID) from a VXLAN encapsulation header of the packet.

In an example of block 201, the I/O board of the gateway VXLAN switch may determine to perform layer 3 forwarding for the packet according to the identified VNID. A method for determining to perform layer 3 forwarding for the packet according to the identified VNID by the I/O board of the gateway VXLAN switch is implemented as follows.

The I/O board of the gateway VXLAN switch searches a local MAC table for a MAC entry matching the VNID and a destination MAC address of the packet. If the MAC entry is searched out and the destination MAC address of the packet is a gateway MAC address of the gateway VXLAN switch, the I/O board of the gateway VXLAN switch determines to perform layer 3 forwarding for the packet.

If the MAC entry is searched out, but the destination MAC address of the packet is not the gateway MAC address of the gateway VXLAN switch, the packet may be forwarded according to a layer 2 packet forwarding method.

In an example of the present disclosure, the local MAC table of the board may be learned by the I/O board according to a MAC entry learning method, or configured by the main board, or learned by the main board according to the MAC entry learning method and distributed to the I/O board.

Figure 2:
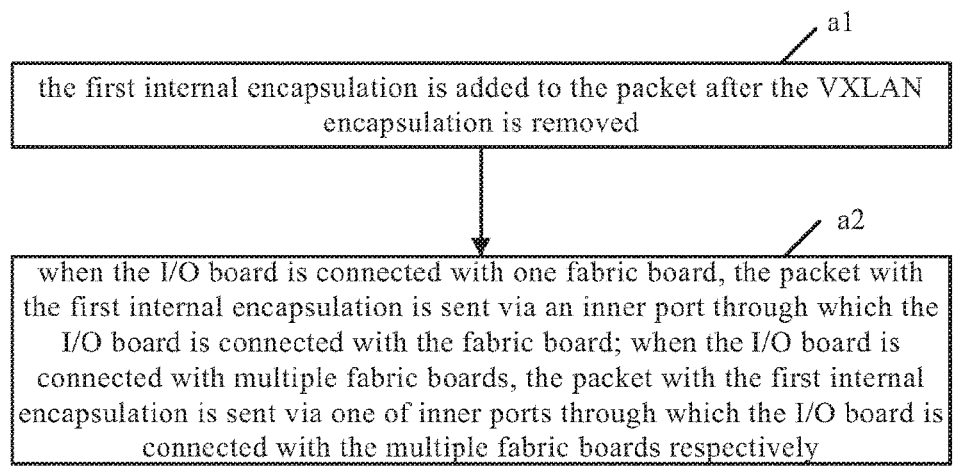
FIG. 2 is a flowchart illustrating a method for sending a packet to a fabric board by an I/O board according to some examples of the present disclosure.

In an example of block 201, in order to ensure that the packet can be sent from the I/O board to the fabric board after the VXLAN encapsulation is removed, the I/O board may add internal encapsulation to the packet. For example, this internal encapsulation may be called first internal encapsulation. Accordingly, in an example of block 201, a method for sending the packet to the fabric board by the I/O board includes following blocks a1 and a2, referring to FIG. 2.

At block a1, the first internal encapsulation is added to the packet after the VXLAN encapsulation is removed.

The first internal encapsulation includes a first destination chip identity and a first destination port identity. The first destination chip identity is a first virtual chip identity, and the first destination port identity is a first virtual port identity.

In an example of the present disclosure, the first virtual chip identity may be a pre-configured virtual chip identity for indicating the fabric board to continue entry searching and packet forwarding. The first virtual port identity may be a pre-configured virtual port identity for indicating the fabric board to continue entry searching and packet forwarding. When the gateway VXLAN switch includes multiple fabric boards, all fabric boards are configured with the first virtual chip identity and the first virtual port identity.

At block a2, when the I/O board is connected with one fabric board, the packet with the first internal encapsulation is sent via an inner port through which the I/O board is connected with the fabric board; when the I/O board is connected with multiple fabric boards, the packet with the first internal encapsulation is sent via one of inner ports through which the I/O board is connected with the multiple fabric boards respectively.

When the I/O board is connected with multiple fabric boards, the inner ports through which the I/O board is connected with the multiple fabric boards respectively may be bundled in an inner port group. Accordingly, in an example of block a2, a process of sending the packet with the first internal encapsulation via one of inner ports through which the I/O board is connected with the multiple fabric boards respectively includes: selecting an inner port from the inner port group and sending the packet with the first internal encapsulation via the selected inner port. There are multiple methods for selecting an inner port from the inner port group, for example, selecting an inner port randomly, or selecting an inner port according to an algorithm such as a Hash algorithm.

According to blocks a1 and a2, the I/O board of the gateway VXLAN switch can send the packet to the fabric board of the gateway VXLAN switch after the VXLAN encapsulation is removed.

At block 202, the fabric board of the gateway VXLAN switch receives the packet sent by the I/O board, determines to perform layer 3 forwarding for the received packet, searches out a layer 3 entry matching a destination IP address of the packet from a local layer 3 table, modifies a source MAC address of the packet into the gateway MAC address of the gateway VXLAN switch, modifies the destination MAC address of the packet into a destination MAC address in the layer 3 entry, and when an egress port in the layer 3 entry is a VXLAN tunnel port, sends the modified packet to an I/O board associated with the egress port in the layer 3 entry in the gateway VXLAN switch.

In an example of the present disclosure, the I/O board associated with the egress port in the layer 3 entry is called a matched I/O board.

Based on the first internal encapsulation described at block 201, a process of determining to perform layer 3 forwarding for the received packet by the fabric board is implemented as follows.

The fabric board determines the first destination chip identity and the first destination port identity in a first internal encapsulation header of the received packet. If the first destination chip identity is the first virtual chip identity and the first destination port identity is the first virtual port identity, the fabric board removes the first internal encapsulation from the packet. If the destination MAC address of the packet is the gateway MAC address of the gateway VXLAN switch after the first internal encapsulation is removed, the fabric board determines to perform layer 3 forwarding for the received packet.

In an example of the present disclosure, when determining that the first destination chip identity is not the first virtual chip identity and/or the first destination port identity is not the first virtual port identity, the fabric board may not remove the first internal encapsulation from the packet, but forward the packet according to the first destination port identity in the first internal encapsulation.

In an example of block 202, the local layer 3 table of the fabric board may be configured by the main board, or learned by the main board according to a layer 3 entry learning method and distributed to the fabric board. In an example, the layer 3 entry may be a routing entry, and may include a destination IP address, a Virtual Local Area Network (VLAN) Identity (ID), a destination MAC address, a source MAC address, an egress port and so on. According to the contents included in the layer 3 entry, the layer 3 entry matching the destination IP address of the packet at block 202 is a layer 3 entry including the destination IP address of the packet.

Figure 3:
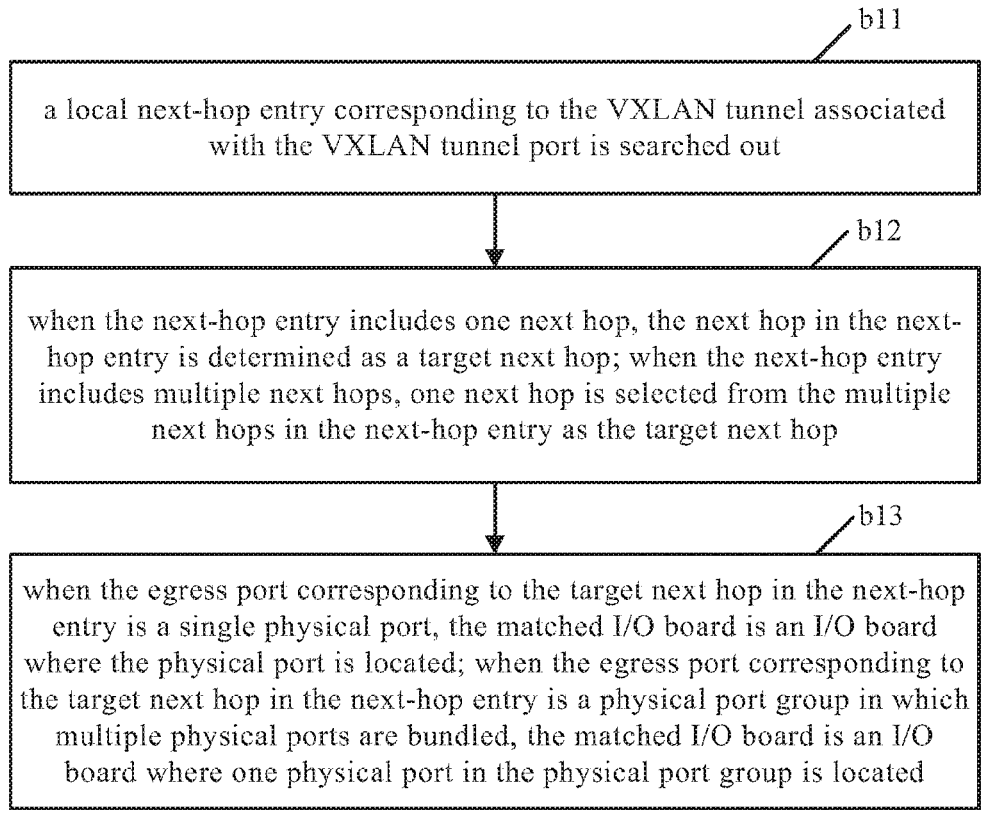
FIG. 3 is a flowchart illustrating a method for determining a matched I/O board according to some examples of the present disclosure.

In an example of the present disclosure, the matched I/O board described at block 202 may be determined according to a next-hop entry corresponding to a VXLAN tunnel associated with a VXLAN tunnel port, where the VXLAN tunnel port is the egress port in the layer 3 entry. In an example, a method for determining the matched I/O board includes following blocks, referring to FIG. 3.

At block b11, a local next-hop entry corresponding to the VXLAN tunnel associated with the VXLAN tunnel port is searched out.

At block b12, when the next-hop entry includes one next hop, the next hop in the next-hop entry is determined as a target next hop; when the next-hop entry includes multiple next hops, one next hop is selected from the multiple next hops in the next-hop entry as the target next hop.

There are multiple methods for selecting one next hop from the multiple next hops in the next-hop entry, for example, selecting one next hop randomly, or selecting one next hop according to a selection method such as a Hash algorithm.

At block b13, when the egress port corresponding to the target next hop in the next-hop entry is a single physical port, the matched I/O board is an I/O board where the physical port is located; when the egress port corresponding to the target next hop in the next-hop entry is a physical port group in which multiple physical ports are bundled, the matched I/O board is an I/O board where one physical port in the physical port group is located.

Herein, one physical port in the physical port group may be selected from the physical port group. There are multiple methods for selecting one physical port from the physical port group, for example, selecting one physical port randomly, or selecting one physical port according to a selection method such as a Hash algorithm.

Accordingly, the matched I/O board can be determined according to blocks b11 to b13.

In an example of the present disclosure, the fabric board adds second internal encapsulation to the modified packet and sends the packet with the second internal encapsulation to the matched I/O board. Accordingly, the matched I/O board may add VXLAN encapsulation to the packet with the second internal encapsulation sent by the fabric board and forwards the packet with VXLAN encapsulation to a VXLAN.

Figure 4:
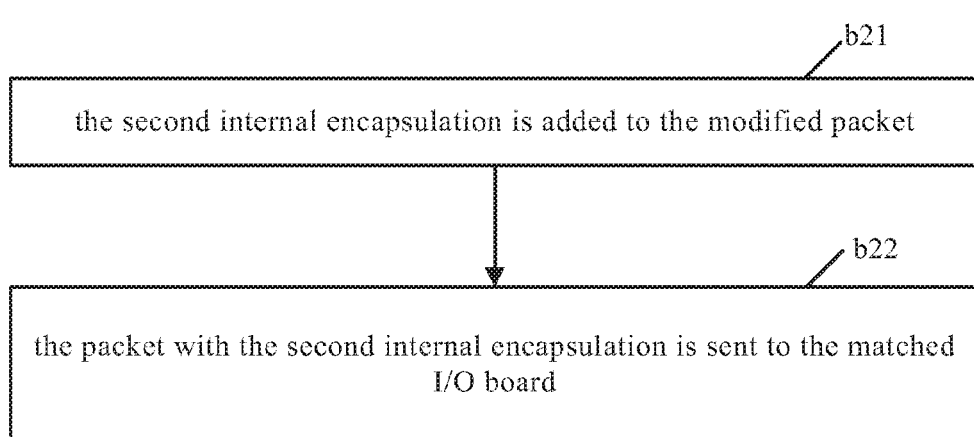
FIG. 4 is a flowchart illustrating a method for sending to a matched I/O board a packet modified by a fabric board according to some examples of the present disclosure.

Accordingly, in an example of block 202, a method for sending the modified packet to the matched I/O board includes following blocks, referring to FIG. 4.

At block b21, the second internal encapsulation is added to the modified packet.

The second internal encapsulation may include a second destination chip identity, a second destination port identity and a VLAN ID in the layer 3 entry. The second destination chip identity is an identity of a chip for forwarding packets on the matched I/O board. If the matched I/O board has one chip, the second destination chip identity may be an identity of the chip. If the matched I/O board has multiple chips, one of the multiple chips may be assigned to forward packets in advance, and the second destination chip identity may be an identity of the assigned chip. The second destination port identity is the second virtual port identity, which may be a pre-configured virtual port identity for indicating the I/O board to continue entry searching and packet forwarding. All I/O boards in the gateway VXLAN switch are configured with the second virtual port identity.

At block b22, the packet with the second internal encapsulation is sent to the matched I/O board.

According to blocks b21 and b22, the packet received from the fabric board by the matched I/O board is the packet with the second internal encapsulation.

At block 203, the matched I/O board in the gateway VXLAN switch receives the packet sent by the fabric board, adds VXLAN encapsulation to the received packet and forwards the packet with the VXLAN encapsulation to a VXLAN.

In an example of block 203, a process of adding the VXLAN encapsulation to the received packet and forwarding the packet with the VXLAN encapsulation to the VXLAN is implemented as follows.

The matched I/O board determines the second destination chip identity and the second destination port identity in a second internal encapsulation header of the packet. If the second destination chip identity is an identity of a chip for forwarding packets on the I/O board and the second destination port identity is the second virtual port identity, the matched I/O board determines a VLAN ID in the second internal encapsulation header of the packet and removes the second internal encapsulation from the packet. Further, the matched I/O board searches out a VNID corresponding to the determined VLAN ID from a predefined mapping relationship between VLAN IDs and VNIDs, searches out a MAC entry matching the destination MAC address of the packet and the searched-out VNID from a local MAC table, searches out a VXLAN tunnel encapsulation entry according to an egress port in the searched-out MAC entry from a local VXLAN tunnel encapsulation table, adds VXLAN encapsulation to the packet according to the searched-out VXLAN tunnel encapsulation entry and the VLAN ID, and sends the packet via the egress port in the searched-out MAC entry.

The egress port in the MAC entry is a VXLAN tunnel port. When the egress port in the MAC entry is the VXLAN tunnel port, the VXLAN tunnel port is a virtual tunnel port. In an example of the present disclosure, the VXLAN tunnel port may be represented with a VXLAN tunnel encapsulation index. For example, the VXLAN tunnel port may be represented with Tunnel1. Tunnel1 is the VXLAN tunnel encapsulation index. Accordingly, the process of searching out the VXLAN tunnel encapsulation entry from the local VXLAN tunnel encapsulation table according to the egress port in the searched-out MAC entry means that the VXLAN tunnel encapsulation entry is searched out from the local VXLAN tunnel encapsulation table according to the VXLAN tunnel encapsulation index.

A process of adding the VXLAN encapsulation to the packet according to the VXLAN tunnel encapsulation entry and the VNID includes: adding a VXLAN outer layer header to the packet according to the VXLAN tunnel encapsulation information in the VXLAN tunnel encapsulation entry, and adding a VXLAN field (for example, a VNID field) to the packet according to the VNID. The VXLAN outer layer header includes outer Ethernet (ETH) encapsulation. The outer ETH encapsulation includes an outer source MAC address, an outer destination MAC address, an outer source IP address and an outer destination IP address.

In an example of the present disclosure, a process of sending the packet via the egress port in the searched-out VXLAN tunnel encapsulation entry includes: identifying the egress port in the searched-out MAC entry; if the egress port is a single physical port, sending the packet via the single physical port; if the egress port is a physical port group in which multiple physical ports are bundled, selecting one physical port from the physical port group, and sending the packet via the selected physical port. The physical port cannot be selected randomly, but should be the same as the physical port selected by the fabric board when determining the matched I/O board. There are multiple methods for selecting the physical port by the I/O board to ensure that the selected physical port is the same as the physical port selected by the fabric board. For example, the fabric board selects the physical port according to a Hash algorithm, and the I/O board also selects the physical port according to the Hash algorithm.

In an example of the present disclosure, the local VXLAN tunnel encapsulation table of the I/O board may be configured on the I/O board in advance.

In an example of the present disclosure, the fabric board of the gateway VXLAN switch uses a chip with a forwarding function and various entry functions, for example, a chip that is the same as that used by the I/O board. Accordingly, when the gateway VXLAN switch receives the packet with the VXLAN encapsulation via the I/O board, the VXLAN encapsulation is removed from the packet with the VXLAN encapsulation; when determining to perform layer 3 forwarding for the packet after removing the VXLAN encapsulation, the packet is sent to the fabric board of the gateway VXLAN switch. Afterwards, the layer 3 entry matching the destination IP address of the packet is searched out from the local layer 3 table of the fabric board. When the egress port in the layer 3 entry is a VXLAN tunnel port, the I/O board associated with the egress port in the layer 3 entry in the gateway VXLAN switch adds the VXLAN encapsulation to the packet and forwards the packet with the VXLAN encapsulation to a VXLAN. Accordingly, a layer 3 access function may be implemented between different VXLANs via the gateway VXLAN switch, and the whole process is performed inside the gateway VXLAN switch. Accordingly, any bandwidth resources are not wasted and wire speed forwarding of the packet can be implemented.

The flowchart shown in FIG. 1 will be described according to an example.

Figure 5:
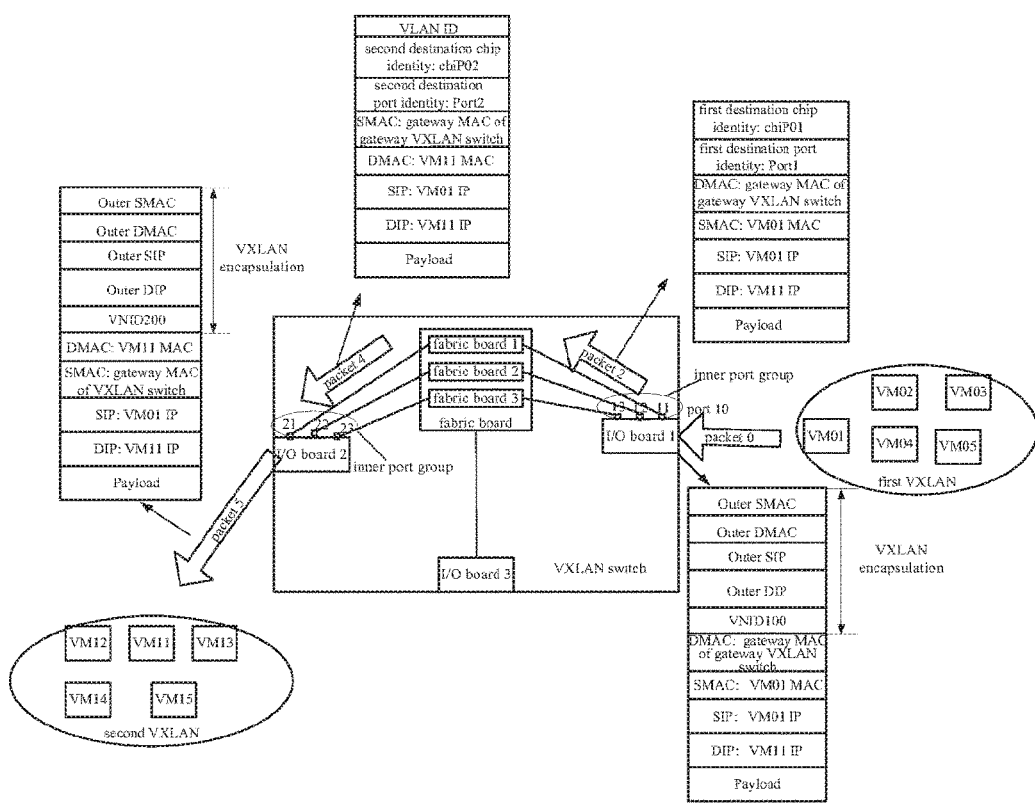
FIG. 5 is a diagram illustrating a networking structure for forwarding a packet across a VXLAN according to some examples of the present disclosure.

FIG. 5 is a diagram illustrating a networking structure for forwarding a packet across a VXLAN according to some examples of the present disclosure. As shown in FIG. 5, Virtual Machine (VM) 01 to VM05 are devices in a first VXLAN, the VNID of the first VXLAN is 100, VM11 to VM15 are devices in a second VXLAN, and the VNID of the second VXLAN is 200.

A gateway VXLAN switch is connected between the first VXLAN and the second VXLAN, and includes a main board, an I/O board and a fabric board. The main board is not shown in FIG. 5. The fabric board uses a chip with a forwarding function and various entry functions. The chip used by the fabric board is the same as that used by the I/O board. FIG. 5 shows three I/O boards of the VXLAN switch.

A process of forwarding a packet across a VXLAN will be described, in which the VM01 visits the VM11.

The I/O board 1 of the gateway VXLAN switch receives a packet from the VM01 in the first VXLAN via a local port (for example, port 10 in FIG. 5). Herein, the packet received by the I/O board is called packet 0. The packet 0 has VXLAN encapsulation corresponding to the first VXLAN. The VXLAN encapsulation includes the VNID100 of the first VXLAN and a VXLAN outer layer header corresponding to the first VXLAN. The VXLAN outer layer header of the packet 0 shown in FIG. 5 includes outer ETH encapsulation. The outer ETH encapsulation includes an outer source MAC address, an outer destination MAC address, an outer source IP address and an outer destination IP address. FIG. 5 shows the structure of the packet with the VXLAN encapsulation.

The I/O board 1 obtains the VNID100 from the VXLAN encapsulation, and removes the VXLAN encapsulation from the packet 0. Herein, the packet 0 from which the VXLAN encapsulation has been removed is called packet 1.

The I/O board 1 searches a local MAC table for a MAC entry matching the destination MAC address of the packet 1 and the obtained VNID100. If the MAC entry is searched out and the destination MAC address of the packet 1 is the gateway MAC address of the gateway VXLAN switch, the I/O board 1 determines to perform layer 3 forwarding for the packet 1.

The I/O board 1 adds first internal encapsulation to the packet 1. A first destination chip identity in the first internal encapsulation is a first virtual chip identity (for example, chip01 shown in FIG. 5), and a first destination port identity in the first internal encapsulation is a first virtual port identity (for example, port1 shown in FIG. 5). Herein, the packet 1 with the first internal encapsulation is called packet 2.

As shown in FIG. 5, the I/O board 1 is connected with each fabric board via an inner port group in which inner port 11, inner port 12 and inner port 13 are bundled. The I/O board 1 selects one inner port from the inner port group, for example, selects the inner port 11 shown in FIG. 5 to send the packet 2 to fabric board 1. A method for selecting an inner port by the I/O board 1 may be configured in advance. For example, the I/O board 1 may perform a Hash operation for the destination IP address of the packet 2 according to a Hash algorithm, and selects an inner port whose number corresponds to a Hash operation result.

The fabric board 1 receives the packet 2, determines that the first destination chip identity and the first destination port identity in the first internal encapsulation header of the packet 2 are chip01 and port1 respectively, which are the first virtual chip identity and the first virtual port identity respectively, and removes the first internal encapsulation from the packet 2. In this case, the packet 1 is restored.

The fabric board 1 identifies the destination MAC address of the packet 1, finds that the destination MAC address of the packet 1 is the gateway MAC address of the gateway VXLAN switch, and determines to perform layer 3 forwarding for the packet 1.

The fabric board 1 searches out a layer 3 entry matching the destination IP address of the packet 1 from a local layer 3 table, modifies the source MAC address of the packet 1 into the gateway MAC address of the gateway VXLAN switch, and modifies the destination MAC address of the packet 1 into a destination MAC address in the searched-out layer 3 entry. In FIG. 5, the destination MAC address in the searched-out layer 3 entry may be the MAC address of the VM11. Herein, the packet 1 whose source MAC address and destination MAC address have been modified is called packet 3.

The fabric board 1 finds that an egress port in the searched-out layer 3 entry is a VXLAN tunnel port, and searches out a local next-hop entry corresponding to a VXLAN tunnel associated with the VXLAN tunnel port (i.e., the egress port in the searched-out layer 3 entry). If the searched-out next-hop entry has one next hop and the egress port of the next hop is a physical port group in which multiple physical ports are bundled, the fabric board 1 selects an I/O board where a physical port in the physical port group is located as a matched I/O board. When the egress port of the next hop is a single physical port, the fabric board 1 selects an I/O board where the single physical port is located as the matched I/O board. Herein, it is supposed that the matched I/O board is I/O board 2.

The fabric board 1 adds second internal encapsulation to the packet 3. Herein, the packet 3 with the second internal encapsulation is called packet 4. The second internal encapsulation includes a VLAN ID in the searched-out layer 3 entry, a second destination chip identity and a second destination port identity. The second destination chip identity is an identity of a chip for forwarding packets on the I/O board 2. In FIG. 5, the identity of the chip is chip02. The second destination port identity is the second virtual port identity. In FIG. 5, the second port identity is port2.

The fabric board 1 sends the packet 4 to the I/O board 2 via an inner port through which the fabric board 1 is connected with the I/O board 2.

The I/O board 2 receives the packet 4 sent by the fabric board 1, and determines the second destination chip identity and the second destination port identity in a second internal encapsulation header of the packet 4. If the second destination chip identity is the identity of the chip (for example, chip02) for forwarding packets on the I/O board 2 and the second destination port identity is port2, the I/O board 2 determines a VLAN ID in the second internal encapsulation header of the packet 4, and removes the second internal encapsulation from the packet 4. In this case, the packet 3 is restored.

The I/O board 2 searches out a VNID (i.e., the VNID200 of the second VXLAN) corresponding to the determined VLAN ID from a predefined mapping relationship between VLAN IDs and VNIDs, and searches out a MAC entry matching the destination MAC address of the packet 3 and the searched-out VNID from a local MAC entry. The I/O board 2 searches out a VXLAN tunnel encapsulation entry from a local VXLAN tunnel encapsulation table according to an egress port in the searched-out MAC entry, adds VXLAN encapsulation to the packet 3 according to the searches-out VXLAN tunnel encapsulation entry and the searched-out VNID (i.e., the VNID200 of the second VXLAN), and sends the packet 3 with the VXLAN encapsulation via an egress port in the searched-out VXLAN tunnel encapsulation entry. Herein, the packet 3 with the VXLAN encapsulation is called packet 5.

A process of adding the VXLAN encapsulation to the packet 3 according to the searched-out VXLAN tunnel encapsulation entry and the searched-out VNID by the I/O board 2 includes: adding a VXLAN outer layer header to the packet 3 according to VXLAN tunnel encapsulation information in the searched-out VXLAN tunnel encapsulation entry, and adding a VXLAN field (i.e., a VNID field) to the packet 3 according to the searched-out VNID (for example, the VNID200 of the second VXLAN shown in FIG. 5). In an example of the VXLAN encapsulation of the packet 3, the outer ETH encapsulation of the VXLAN outer layer header includes an outer source MAC address, an outer destination MAC address, an outer source IP address and an outer destination IP address, as shown in FIG. 5.

The I/O board 2 sends the packet 5 according to the egress port in the searched-out VXLAN tunnel encapsulation entry. In an example, a process of sending the packet 5 according to the egress port in the searched-out VXLAN tunnel encapsulation entry by the I/O board 2 includes: identifying the egress port in the searched-out VXLAN tunnel encapsulation entry. The identified egress port is an egress port of a next hop found by the fabric board 1. When the egress port of the next hop found by the fabric board 1 is a physical port group in which multiple physical ports are bundled, the identified egress port in the searched-out VXLAN tunnel encapsulation entry is the physical port group. Accordingly, the I/O board 2 may select one physical port from the identified egress ports according to a method for selecting a physical port by the fabric board 1 when determining the matched I/O board, thereby ensuring that the port sending the packet 5 is identical to the physical port selected by the fabric board 1.

The VM11 of the second VXLAN can receive the packet sent by the VM01. Accordingly, the packet can be forwarded from the first VXLAN to the second VXLAN via the gateway VXLAN switch.

An apparatus for forwarding a packet across a VXLAN will be described with reference to examples hereinafter.

Figure 6:
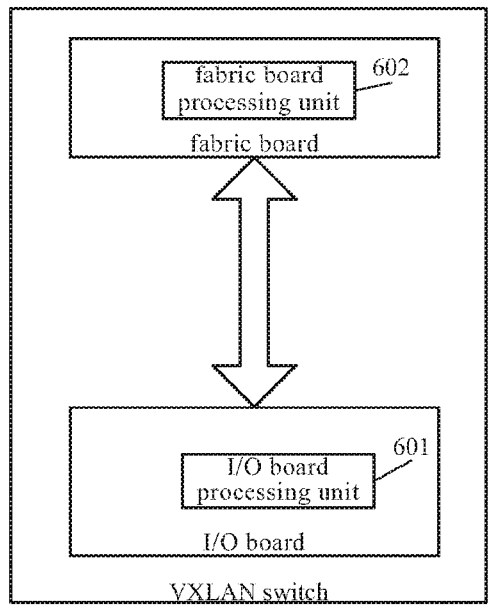
FIG. 6 is a diagram illustrating a structure of an apparatus for forwarding a packet across a VXLAN according to some examples of the present disclosure.

FIG. 6 is a diagram illustrating a structure of an apparatus for forwarding a packet across a VXLAN according to some examples of the present disclosure. The apparatus may be a VXLAN switch used as a gateway. The VXLAN switch includes an I/O board and a fabric board. Both the number of I/O boards and the number of fabric boards are larger than or equal to 1. The fabric board uses a chip with a forwarding function and various entry functions. As shown in FIG. 6, the VXLAN switch further includes an I/O board processing unit 601 and a fabric board processing unit 607.

The I/O board processing unit 601 is located on an I/O board of the VXLAN switch, and may receive a packet with first VXLAN encapsulation, remove the first VXLAN encapsulation from the packet with the first VXLAN encapsulation, determine to perform layer 3 forwarding for the packet, and send the packet to a fabric board of the VXLAN switch; receive a packet sent by the fabric board, add second VXLAN encapsulation to the received packet and forward the packet with the second VXLAN encapsulation to a VXLAN.

The fabric processing unit 602 is located on the fabric board of the VXLAN switch, and may receive the packet sent by the I/O board, determine to perform layer 3 forwarding for the received packet, search out a layer 3 entry matching a destination IP address of the packet from a local layer 3 table, modify a source MAC address of the packet into a gateway MAC address of the VXLAN switch, modify a destination MAC address of the packet into a destination MAC address in the layer 3 entry, and when an egress port in the layer 3 entry is a VXLAN tunnel port, send the modified packet to an I/O board associated with the egress port in the layer 3 entry in the VXLAN switch.

In an example, before removing the first VXLAN encapsulation from the packet with the first VXLAN encapsulation, the I/O board processing unit 601 may identify a VNID from a VXLAN encapsulation header of the packet.

The I/O board processing unit 601 may determine to perform layer 3 forwarding for the packet through following processes. The I/O board processing unit 601 searches a local MAC table for a MAC entry matching the VNID and the destination MAC address of the packet. If the MAC entry is searched out and the destination MAC address of the packet is the gateway MAC address of the VXLAN switch, the I/O board processing unit 601 determines to perform layer 3 forwarding for the packet.

In an example, the board processing unit 601 may send the packet to the fabric board of the VXLAN switch through following processes.

The I/O board processing unit 601 adds first internal encapsulation to the packet after the first VXLAN encapsulation is removed. The first internal encapsulation includes a first destination chip identity and a first destination port identity. The first destination chip identity is a first virtual chip identity, and the first destination port identity is a first virtual port identity.

In an example, when the I/O board is connected with one fabric board, the I/O board processing unit 601 sends the packet with the first internal encapsulation via an inner port through which the I/O board is connected with the fabric board. When the I/O board is connected with multiple fabric boards, the I/O board processing unit 601 sends the packet with the first internal encapsulation via one of inner ports through which the I/O board is connected with the multiple fabric boards respectively.

In an example, the fabric board processing unit 602 may determine to perform layer 3 forwarding for the received packet with the first internal encapsulation through following processes.

The fabric board processing unit 602 determines the first destination chip identity and the first destination port identity in a first internal encapsulation header of the received packet with the first internal encapsulation. If the first destination chip identity is the first virtual chip identity and the first destination port identity is the first virtual port identity, the fabric board processing unit 602 removes the first internal encapsulation from the packet with the first internal encapsulation. When determining that the destination MAC address of the packet is the gateway MAC address of the VXLAN switch after the first internal encapsulation is removed, the fabric board processing unit 602 determines to perform layer 3 forwarding for the packet.

In an example, the fabric board processing unit 602 may send the modified packet to the I/O board associated with the egress port in the layer 3 entry in the VXLAN switch through following processes. The fabric board processing unit 602 adds second internal encapsulation to the packet, and sends the packet with the second internal encapsulation to the I/O board associated with the egress port in the layer 3 entry in the VXLAN switch. The second internal encapsulation may include a second destination chip identity, a second destination port identity and a VLAN ID in the layer 3 entry. The second destination chip identity is an identity of a chip for forwarding packets on the I/O board associated with the egress port in the layer 3 entry. The second destination port identity is the second virtual port identity.

In an example, the I/O board processing unit 601 may add the second VXLAN encapsulation to the modified packet and forward the packet with the second VXLAN encapsulation to the VXLAN through following processes.

The I/O board processing unit 601 determines the second destination chip identity and the second destination port identity in a second internal encapsulation header of the packet. If the second destination chip identity is an identity of a chip for forwarding packets on the I/O board and the second destination port identity is the second virtual port identity, the I/O board processing unit 601 determines a VLAN ID in the second internal encapsulation header of the packet and removes the second internal encapsulation from the packet, searches out a VNID corresponding to the determined VLAN ID from a predefined mapping relationship between VLAN IDs and VNIDs, searches out a MAC entry matching the destination MAC address of the packet and the searched-out VNID from a local MAC entry of the I/O board, searches out a VXLAN tunnel encapsulation entry according to an egress port in the searched-out MAC entry from a local VXLAN tunnel encapsulation table of the I/O board, adds the second VXLAN encapsulation to the packet according to the searched-out VXLAN tunnel encapsulation entry and the VLAN ID, and sends the packet with the second VXLAN encapsulation via an egress port in the searched-out VXLAN tunnel encapsulation entry.

In an example, the fabric board processing unit 602 may determine the I/O board associated with the egress port in the layer 3 entry through following processes.

The fabric board processing unit 602 searches out a local next-hop entry corresponding to a VXLAN tunnel associated with the VXLAN tunnel port.

When the next-hop entry includes one next hop, the fabric board processing unit 602 determines the next hop in the next-hop entry as a target next hop. When the next-hop entry includes multiple next hops, the fabric board processing unit 602 selects one next hop from the multiple next hops in the next-hop entry as the target next hop.

When an egress port corresponding to the target next hop in the next-hop entry is a single physical port, the fabric board processing unit 602 determines an I/O board where the physical port is located as the I/O board associated with the egress port in the layer 3 entry. When the egress port corresponding to the target next hop in the next-hop entry is a physical port group in which multiple physical ports are bundled, the fabric board processing unit 602 determines an I/O board where one physical port in the physical port group is located as the I/O board associated with the egress port in the layer 3 entry.

Figure 7:
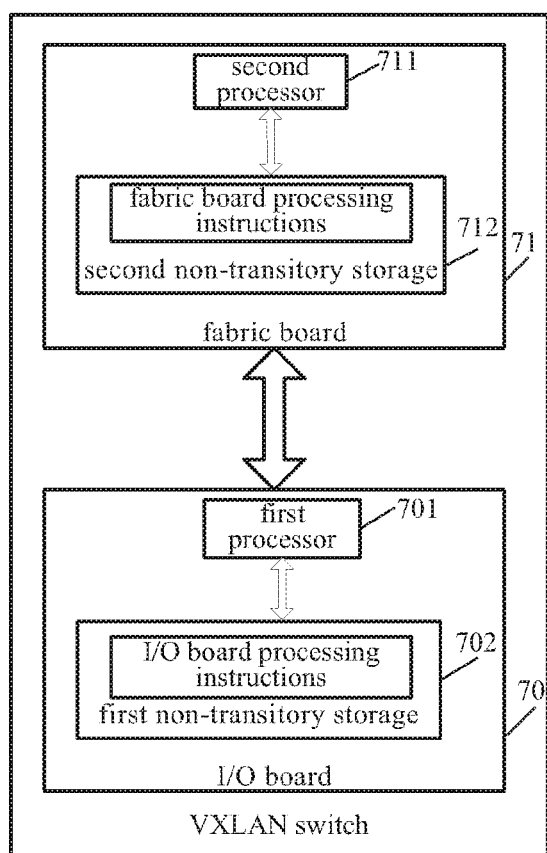
FIG. 7 is a diagram illustrating a hardware structure of an apparatus for forwarding a packet across a VXLAN according to some examples of the present disclosure.

A hardware structure of the apparatus for forwarding a packet across a VXLAN is also provided according to some examples of the present disclosure. The apparatus is a VXLAN switch used as a gateway. As shown in FIG. 7, the hardware structure of the VXLAN switch may include an I/O board 70 and a fabric board 71.

The I/O board 70 may include a first processor 701 (for example, a CPU) and a first non-transitory storage 702.

The first non-transitory storage 702 may store machine-readable instructions, which include I/O board processing instructions that can be executed by the first processor 701.

The first processor 701 may read and execute the I/O board processing instructions stored in the first non-transitory storage 702 to implement the functions of the I/O board processing unit shown in FIG. 6.

The fabric board 71 may include a second processor 711 (for example, a CPU) and a second non-transitory storage 712.

The second non-transitory storage 712 may store machine-readable instructions, which include fabric board processing instructions that can be executed by the second processor 711.

The second processor 711 may read and execute the fabric board processing instructions stored in the second non-transitory storage 712 to implement the functions of the fabric board processing unit shown in FIG. 6.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A packet forwarding method, comprising:
   receiving, by an Input/Output (I/O) board of a Virtual eXtensible Local Area Network (VXLAN) switch, a packet with a first VXLAN encapsulation, removing the first VXLAN encapsulation from the packet with the first VXLAN encapsulation, determining to perform layer 3 forwarding for the packet, and sending the packet to a fabric board of the VXLAN switch;
   receiving, by the fabric board of the VXLAN switch, the packet sent by the I/O board, determining to perform layer 3 forwarding for the received packet, searching out a layer 3 entry matching a destination Internet Protocol (IP) address of the packet from a local layer 3 table, modifying a source Media Access Control (MAC) address of the packet into a gateway MAC address of the VXLAN switch, modifying a destination MAC address of the packet into a destination MAC address in the layer 3 entry, and when an egress port in the layer 3 entry is a VXLAN tunnel port, sending the modified packet to an I/O board associated with the egress port in the layer 3 entry in the VXLAN switch; and
   receiving, by the I/O board associated with the egress port in the layer 3 entry in the VXLAN switch, the packet sent by the fabric board, and adding a second VXLAN encapsulation to the received packet and forwarding the packet with the second VXLAN encapsulation to a VXLAN,
   wherein, the sending the modified packet to the I/O board associated with the egress port in the layer 3 entry in the VXLAN switch comprises: adding a second internal encapsulation to the modified packet, and sending the packet with the second internal encapsulation to the I/O board associated with the egress port in the layer 3 entry in the VXLAN switch, wherein the second internal encapsulation comprises a second destination chip identity, a second destination port identity, and a Virtual Local Area Network (VLAN) ID in the layer 3 entry, the second destination chip identity is an identity of a chip for forwarding packets on the I/O board associated with the egress port in the layer 3 entry in the VXLAN switch, and the second destination port identity is a second virtual port identity; and the adding the second VXLAN encapsulation to the received packet and forwarding the packet with the second VXLAN encapsulation to the VXLAN comprises:

determining the second destination chip identity and the second destination port identity in a second internal encapsulation header of the packet; when the second destination chip identity is the identity of the chip for forwarding packets on the I/O board associated with the egress port in the layer 3 entry and the second destination port identity is the second virtual port identity, determining a VLAN ID in the second internal encapsulation header of the packet and removing the second internal encapsulation from the packet, searching out Virtual Network ID (VNID) corresponding to the determined VLAN ID from a predefined mapping relationship between VLAN IDs and VNIDs, searching out a MAC entry matching the destination MAC address of the packet and the searched-out VNID from a local MAC entry of the I/O board associated with the egress port in the layer 3 entry, searching out a VXLAN tunnel encapsulation entry from a local VXLAN tunnel encapsulation entry according to an egress port in the searched-out MAC entry; adding the second VXLAN encapsulation to the packet according to the VXLAN tunnel encapsulation entry and the VLAN ID, and sending the packet with the second VXLAN encapsulation via the egress port in the MAC entry.

2. The method of claim 1, before the I/O board of the VXLAN switch removes the first VXLAN encapsulation from the packet with the first VXLAN encapsulation, further comprising: identifying the VNID from a VXLAN encapsulation header of the packet, wherein the determining, by the I/O board of the VXLAN switch, to perform layer 3 forwarding for the packet comprises: searching a local MAC table for a MAC entry matching the VNID and the destination MAC address of the packet; when the MAC entry is searched out and the destination MAC address of the packet is the gateway MAC address of the VXLAN switch, determining to perform layer 3 forwarding for the packet.

3. The method of claim 1, wherein the sending the packet to the fabric board of the VXLAN switch comprises:

adding a first internal encapsulation to the packet, wherein the first internal encapsulation comprises a first destination chip identity and a first destination port identity, the first destination chip identity is a first virtual chip identity, and the first destination port identity is a first virtual port identity;

when the I/O board is connected with one fabric board, sending the packet with the first internal encapsulation via an inner port through which the I/O board is connected with the fabric board; when the I/O board is connected with multiple fabric boards, sending the packet with the first internal encapsulation via one of inner ports through which the I/O board is connected with the multiple fabric boards respectively; and the determining, by the fabric board, to perform layer 3 forwarding for the received packet comprises:

determining the first destination chip identity and the first destination port identity in a first internal encapsulation header of the received packet; when the first destination chip identity is the first virtual chip identity and the first destination port identity is the first virtual port identity, removing the first internal encapsulation from the packet with the first internal encapsulation; when determining that the destination MAC address of the packet is the gateway MAC address of the VXLAN switch, determining to perform layer 3 forwarding for the received packet.

4. The method of claim 1, wherein the I/O board associated with the egress port in the layer 3 entry is determined through a process of:

searching out a local next-hop entry corresponding to a VXLAN tunnel associated with a VXLAN tunnel port;

when a next-hop entry includes one next hop, determining the next hop in the next-hop entry as a target next hop; when the next-hop entry includes multiple next hops, selecting one of the multiple next hops as the target next hop; and when an egress port corresponding to the target next hop in the next-hop entry is a single physical port, determining an I/O board where the physical port is located as the I/O board associated with the egress port in the layer 3 entry; when the egress port corresponding to the target next hop in the next-hop entry is a physical port group in which multiple physical ports are bundled, determining an I/O board where one physical port in the physical port group is located as the I/O board associated with the egress port in the layer 3 entry.

5. A Virtual eXtensible Local Area Network (VXLAN) switch, comprising:

an Input/Output (I/O) board processing unit, located on an I/O board of the VXLAN switch, and to receive a packet with a first VXLAN encapsulation, remove the first VXLAN encapsulation from the packet with the first VXLAN encapsulation, determine to perform layer 3 forwarding for the packet, and send the packet to a fabric board of the VXLAN switch; receive a packet sent by the fabric board, add a second VXLAN encapsulation to the received packet and forward the packet with the second VXLAN encapsulation to a VXLAN; and a fabric processing unit, located on the fabric board of the VXLAN switch, and to receive the packet sent by the I/O board, determine to perform layer 3 forwarding for the received packet, search out a layer 3 entry matching a destination Internet Protocol (IP) address of the packet from a local layer 3 table, modify a source Media Access Control (MAC) address of the packet into a gateway MAC address of the VXLAN switch, modify a destination MAC address of the packet into a destination MAC address in the layer 3 entry, and when an egress port in the layer 3 entry is a VXLAN tunnel port, send the modified packet to an I/O board associated with the egress port in the layer 3 entry in the VXLAN switch, wherein, the fabric board processing unit to send the modified packet to the I/O board associated with the egress port in the layer 3 entry in the VXLAN switch through a process of:

adding a second internal encapsulation to the packet, and sending the packet with the second internal encapsulation to the I/O board associated with the egress port in the layer 3 entry in the VXLAN switch, wherein the second internal encapsulation includes a second destination chip identity, a second destination port identity, and a Virtual Local Area Network (VLAN) ID in the layer 3 entry, the second destination chip identity is an identity of a chip for forwarding packets on the I/O board associated with the egress port in the layer 3 entry, and the second destination port identity is a second virtual port identity; and the I/O board processing unit is to add the second VXLAN encapsulation to the modified packet and forward the packet with the second VXLAN encapsulation to the VXLAN through a process of:

determining the second destination chip identity and the second destination port identity in a second internal encapsulation header of the packet; when the second destination chip identity is the identity of the chip for forwarding packets on the I/O board and the second destination port identity is the second virtual port identity, determining a VLAN ID in the second internal encapsulation header of the packet, removing the second internal encapsulation from the packet, searching out a VNID corresponding to the determined VLAN ID from a predefined mapping relationship between VLAN IDs and VNIDs, searching out a MAC entry matching the destination MAC address of the packet and the searched-out VNID from a local MAC entry of the I/O board, searching out a VXLAN tunnel encapsulation entry according to an egress port in the searched-out MAC entry from a local VXLAN tunnel encapsulation table of the I/O board, adding the second VXLAN encapsulation to the packet according to the searched-out VXLAN tunnel encapsulation entry and the VLAN ID, and sending the packet with the second VXLAN encapsulation via an egress port in the searched-out VXLAN tunnel encapsulation entry.

6. The VXLAN switch of claim 5, wherein, before removing the first VXLAN encapsulation from the packet with the first VXLAN encapsulation, the I/O board processing unit is further to identify a VNID from a VXLAN encapsulation header of the packet; and the I/O board processing unit is to determine to perform layer 3 forwarding for the packet through a process of: searching a local MAC table for the MAC entry matching the VNID and the destination MAC address of the packet, and when the MAC entry is searched out and the destination MAC address of the packet is the gateway MAC address of the VXLAN switch, determining to perform layer 3 forwarding for the packet.

7. The VXLAN switch of claim 5, wherein the I/O board processing unit is to send the packet to the fabric board of the VXLAN switch through a process of:

adding a first internal encapsulation to the packet after the first VXLAN encapsulation is removed, wherein the first internal encapsulation includes a first destination chip identity and a first destination port identity, the first destination chip identity is a first virtual chip identity, and the first destination port identity is a first virtual port identity;

when the I/O board is connected with one fabric board, sending the packet with the first internal encapsulation via an inner port through which the I/O board is connected with the fabric board; when the I/O board is connected with multiple fabric boards, sending the packet with the first internal encapsulation via one of inner ports through which the I/O board is connected with the multiple fabric boards respectively; and the fabric board processing unit is to determine to perform layer 3 forwarding for the received packet with the first internal encapsulation through a process of:

determining the first destination chip identity and the first destination port identity in a first internal encapsulation header of the received packet with the first internal encapsulation, when the first destination chip identity is the first virtual chip identity and the first destination port identity is the first virtual port identity, removing the first internal encapsulation from the packet with the first internal encapsulation, when determining that the destination MAC address of the packet is the gateway MAC address of the VXLAN switch after the first internal encapsulation is removed, determining to perform layer 3 forwarding for the packet.

8. The VXLAN switch of claim 5, wherein the fabric board processing unit is to determine the I/O board associated with the egress port in the layer 3 entry through a process of:

searching out a local next-hop entry corresponding to a VXLAN tunnel associated with the VXLAN tunnel port;

when the local next-hop entry includes one next hop, determining the next hop in the next-hop entry as a target next hop; when the next-hop entry includes multiple next hops, selecting one next hop from the multiple next hops in the next-hop entry as the target next hop; and when an egress port corresponding to the target next hop in the next-hop entry is a single physical port, determining an I/O board where the physical port is located as the I/O board associated with the egress port in the layer 3 entry; when the egress port corresponding to the target next hop in the next-hop entry is a physical port group in which multiple physical ports are bundled, determining an I/O board where one physical port in the physical port group is located as the I/O board associated with the egress port in the layer 3 entry.

* * * * *